United States Patent [19]

Luc

[11] 4,099,304

[45] Jul. 11, 1978

[54] SCREW TYPE CLAMPING COLLAR

[75] Inventor: André R. Luc, Ozoir-la-Ferriere, France

[73] Assignee: Tridon-Serflex S.A., Bry-sur-Marne, France

[21] Appl. No.: 692,334

[22] Filed: Jun. 3, 1976

[30] Foreign Application Priority Data

Jun. 4, 1975 [FR] France .................. 75 18314

[51] Int. Cl.² ........................................... F16L 33/08
[52] U.S. Cl. ............................................ 24/274 R
[58] Field of Search ...................... 24/274 R, 274 P

[56] References Cited

U.S. PATENT DOCUMENTS

| | | | |
|---|---|---|---|
| 2,607,092 | 8/1952 | Rubly | 24/274 R |
| 2,940,150 | 6/1960 | Rizzo | 24/274 R |
| 3,087,220 | 4/1963 | Tinsley | 24/274 R |
| 3,521,334 | 7/1970 | Bergstrom | 24/274 R |
| 3,900,932 | 8/1975 | Allert | 24/274 R |

FOREIGN PATENT DOCUMENTS

| | | | |
|---|---|---|---|
| 2,136,677 | 2/1973 | Fed. Rep. of Germany | 24/274 R |
| 80,296 | 12/1955 | Netherlands | 24/274 R |
| 526,281 | 9/1940 | United Kingdom | 24/274 R |
| 607,598 | 9/1948 | United Kingdom | 24/274 R |
| 526,139 | 9/1940 | United Kingdom | 24/274 R |
| 607,595 | 9/1948 | United Kingdom | 24/274 P |

Primary Examiner—Bernard A. Gelak

[57] ABSTRACT

A screw-type clamping collar includes a flexible band having first and second end portions and inner and outer surfaces with a rack of teeth formed in said first end portion and having a part thereof protruding inwardly of the inner surface of the flexible band, on the side of the parts to be clamped. The second end portion of the band has a screw bearing saddle housing rigidly connected to it, and an axial opening formed therein having a width corresponding substantially to the width of the protrusions. These protrusions are engaged and maintained transversely in the opening of the band over a length corresponding approximately to the length of the housing and of the screw to guide movement of the band beneath the screw.

8 Claims, 8 Drawing Figures

SCREW TYPE CLAMPING COLLAR

The present invention relates to clamping collars for tubes, hoses and the like; and in particular to clamping collars of the screw type in which a screw bearing saddle housing on one end of a flexible band cooperates with a rack of teeth formed on the band.

In flexible screw type clamping collars of conventional construction, a screw is mounted in a saddle housing or fitting for free rotation in a fixed axial position on the housing. The latter is usually rigidly connected at or near one end of a flexible band whose other end may be engaged, when the band is bent, between the housing and the end of the band to which the housing is secured. In this position the threads of the screw cooperate with a corresponding rack provided on said band so that rotation of the screw will cause the band ends to move with respect to one another and increase or decrease the diameter of the clamping band.

A variety of different types of screw-type clamping collars have been previously proposed and it is an object of the present invention to provide an improved clamping collar of this type.

Another object of the present invention is to improve the characteristics of screw-type collars, particularly with respect to the critical transverse connection point between the saddle housing and flexible collar or band.

Another object of the invention is to provide improved mounting conditions for the saddle housing.

Another object of the present invention is to provide an improved screw-type clamping collar which is relatively simple in construction and economical to manufacture.

In accordance with an aspect of the present invention a screw-type clamping collar is provided which includes a flexible band having first and second end portions and inner and outer surfaces. The band has a row or rack of teeth formed therein, as by hot or cold stamping, adjacent its first end portion and extending along the band for a predetermined distance. The rack teeth include portions protruding from the inner surface of the band.

A saddle housing or bracket is rigidly mounted on the band adjacent its second end portion and the housing has a passage formed in it for receiving the first end portion of the band above the second end portion thereof. A screw is rotatably mounted in the housing and is held against axial movement therein. The screw is positioned axially of said band so that its threads will engage the rack teeth on the first end portion of the band in the housing passage to move the first end portion thereof with respect to the second end portion upon rotation of the screw.

The second end portion of the band, on which the saddle housing is mounted, has an elongated slot formed therein which extends for a predetermined distance axially of the band. The slot has a width dimension transversely of the band which is substantially equal to the width dimension of the rack so that the slot receives and cooperates with the protruding portions of the rack teeth on the inner side of the band to guide movement of the first end portion of the band with respect to the second end portion during rotation of the screw.

The saddle housing is also specially formed to lock it in position on the band and to rotatably mount the screw therein.

The above, and other objects, features and advantages of this invention will be apparent in the following detailed description of an illustrative embodiment which is to be read in connection with the accompanying drawings, wherein.

Figure 1:
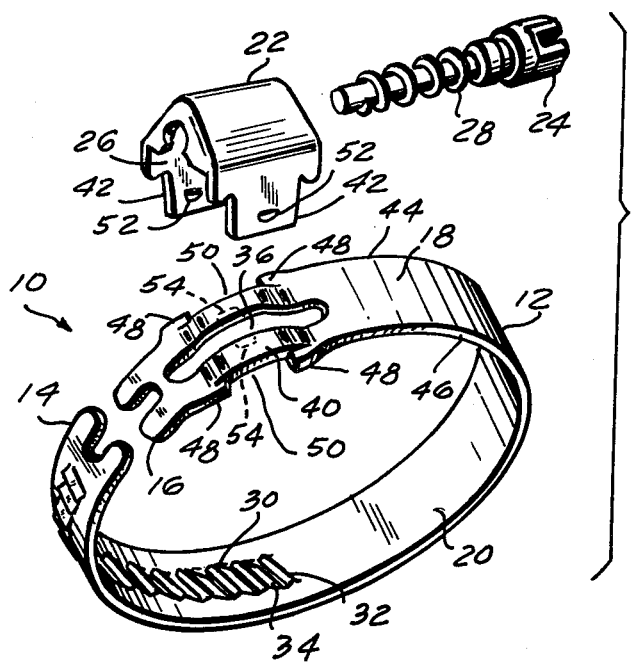
FIG. 1 is an exploded perspective view of a screw-type clamping collar constructed in accordance with the present invention.
Figure 2:
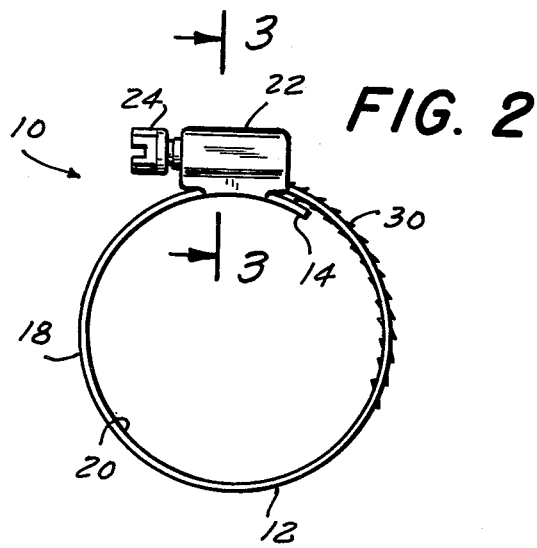
FIG. 2 is a side elevational view of the collar of FIG. 1, but with all of the elements thereof being assembled.

Referring now to the drawings in detail, and initially to FIGS. 1 and 2, a screw-type clamping collar 10 is illustrated of the type which is particularly adapted to be used for clamping or securing a hose (e.g. an automobile engine hose) to another member, such as a rigid pipe.

Collar 10 includes an elongated flexible band 12 having first and second end portions 14, 16 as well as inner and outer sides 18, 20. A screw-bearing saddle housing 22 is secured to the end 16 of the band, as described more fully hereinafter, and includes a screw 24 rotatably mounted therein but held against axial movement. The housing defines a passage 26 above the second end of the band through which the band end 14 is received for engagement by the threads 28 of the screw.

The first or free end portion 14 of flexible band 12 includes a gear type rack 30 formed therein by cutting out or stamping (hot or cold stamping depending upon the material of which the band is made) transverse spaces 32 in the band while bending the remaining metal at an angle to the plane of the band. In this manner, the bent metal strips or teeth 34 protrude, in part, from the band at least over its inner side 20, i.e. the side of the band facing the part or hose to be clamped. In the illustrative embodiment, the rack teeth also protrude over the outer side 18 of the band to improve meshing of the teeth with the threads 28 of screw 24.

The second or opposite end 16 of band 12 has an opening or slot 36 formed therein along the longitudinal axis of the band. This slot has a width corresponding to the width of the protruding rack teeth 34. In addition, along slot 36, the band is bent or shaped to form a projection 40 which bows towards the outer side, i.e. the rack side, of the band. This projection has a depth or height "H" (See FIG. 8) on the inner side of the band which is substantially equal to the thickness of the lugs 42 of the screw-bearing housing 22 (see FIG. 1).

The side edges 44, 46 of band 12, adjacent opening 36 and projection 40, have spaced stop points or shoulders 48 which define recesses 50 therebetween parallel to slot 36. These recesses are used for the assembling and securing the screw-bearing saddle housing 22 to band 12 with the aid of the housing's lugs 42 (see FIG. 1).

Figure 5:
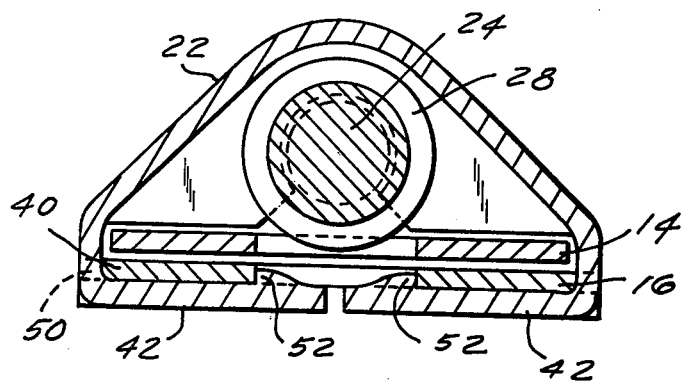
FIG. 5 is a sectional view, similar to FIG. 3, on an enlarged scale, showing one embodiment of the means for securing the saddle housing to the flexible band.

In assembling the clamping collar of the invention the saddle housing 22 is positioned over the second end portion of band 12 with its lugs or legs 42 received in the recess 50 between stops 48 on the band. The lugs are then bent under the inner surface 20 of the second end portion of the band at projection 40. Preferably, as seen in FIGS. 1 and 5, the lugs 42 of screw-bearing saddle housing 22 each have a boss 52 which is stamped in the lug, or shaped by some other method, and which, upon the bending of the lugs for assembling of the housing onto the flexible band engage and rest on the lateral sides of the opening 36 in order to maintain the assembly transversely in the band (see FIG. 5), i.e. to prevent transverse movement of the housing and/or its lugs. When this mounting arrangement for the housing is used, as in the illustrative embodiment, with a flexible band having rack teeth protruding in the slot in the band end, care must be taken to insure that the heights of protruding teeth and of bosses 52 are such as to permit their being housed in the the thickness of the opening 36. Alternatively cavities 54 can be provided along opposite sides of slot 36 for receiving bosses 52.

Figure 6:
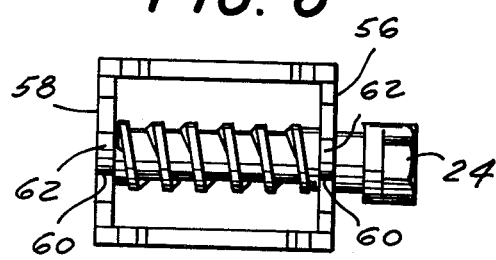
FIG. 6 is a bottom view, on an enlarged scale, of the saddle housing or bracket and screw assembly.
Figure 7:
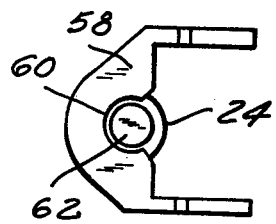
FIG. 7 is an end view taken in the direction indicated by the arrow F in FIG. 6.

In accordance with another feature of the present invention, shown in FIGS. 6 and 7, the screw-bearing saddle housing 22 is made to readily rotatably mount screw 24 while holding it against axial movement. For this purpose, the opposing end walls 56, 58 of the housing have openings 60 formed therein for receiving the screw. These openings have a somewhat larger diameter than the diameter of the adjacent bearing surfaces 62 of the screw in order to permit the screw to be inserted therein by the elastic spreading apart of the side walls. The walls then return to their original positions and maintain the recessed bearing faces 62 of the screw against axial movement. The screw is thus mounted in the housing before assembling onto the flexible band, in order to make mounting of the housing and screw assembly easier. The screw can, of course, turn freely in the openings 60. It is noted that openings 60 have a generally circular periphery defining an arc of more than 180° and less than 360° to substantially surround the screw and retain it in the housing while allowing rotation thereof.

Figure 3:
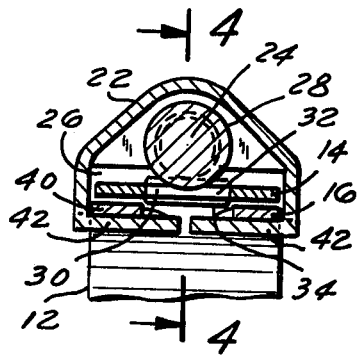
FIG. 3 is a sectional view, on an enlarged scale, taken along line 3—3 of FIG. 2.
Figure 4:
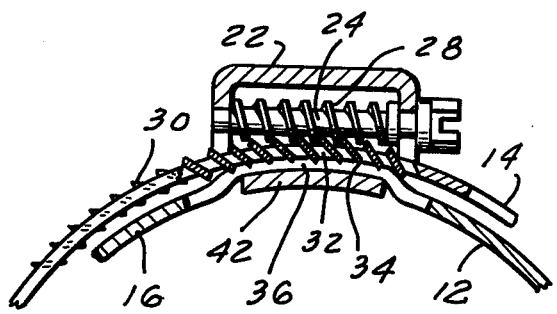
FIG. 4 is a sectional view taken along line 4—4 of FIG. 3.
Figure 8:
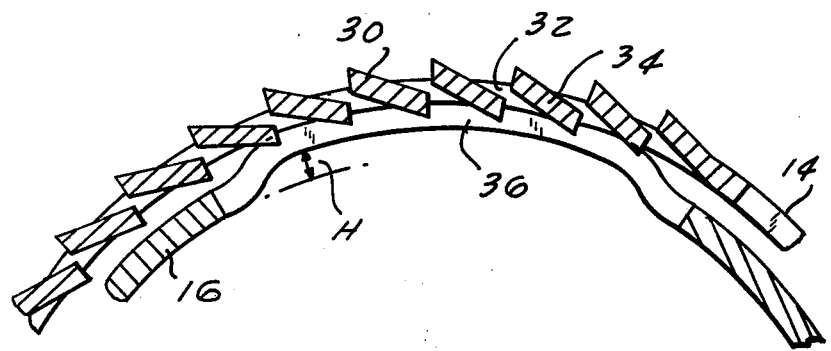
FIG. 8 is a partial side view, on an enlarged scale, showing the engagement of the protrusions of the rack in the flexible band.

By this arrangement, as can be seen in particular in FIGS. 3, 4 and 8, the inner protruding portions of the teeth rack 30 engage in the opening 36 when the end 14 of the band is inserted in the passage 26 of housing 22 upon use of the clamps for clamping on a part. This engagement permits firm guiding of the two ends of the band upon clamping by turning of the screw, thus avoiding deformations, twisting, or abnormal stresses caused by the action of the screw.

Furthermore, the projection 40 of the band permits the lugs 52 of the saddle housing to be received below the inner face of the band in substantially flush relation with that inner face. It also facilitates the penetration of the protruding portions of the rack teeth in the opening 36, as can be seen in FIG. 8.

It should also be noted that lugs 42 of the screw-bearing saddle housing may be bonded under the flexible band by an epoxy resin or cyanoacrylate adhesive or the like.

From the above description it is apparent that the present invention provides a firm and strong connection between the clamp's saddle housing and the flexible band by the bending of the lugs 42 over the band and the hooking-on of the lug bosses 52 in the opening of the band. In addition dependable clamping operations and easy handling are assured as a result of the guiding of the rack protrusions in the opening of the band while the saddle housing is easily mounted on the band by slotted end walls and openings in the housing receiving the screw.

Although an illustrative embodiment of the present invention has been described herein with reference to the accompanying drawings, it is to be understood that the invention is not limited to that precise embodiment but that various changes and modifications may be effected therein by one skilled in the art without departing from the scope or spirit of this invention.

What is claimed is:

1. A screw-type clamping collar comprising a flexible band having first and second end portions and inner and outer surfaces; said band having a rack of teeth formed thereon adjacent said first end portion and extending along the band for a predetermined distance, said rack teeth including portions protruding from the inner surface of said band, to be adjacent the part to be clamped; a saddle housing rigidly mounted adjacent the second end portion of said band and having a passage therein for receiving the first end portion of the band above the second end portion thereof; a screw rotatably mounted in said housing and fixed against axial movement thereon, said screw being positioned axially of said band whereby its threads will engage the rack teeth on the first end portion of the band in said housing passage to move said first end portion with respect to said second end portion upon rotation of said screw; said second end portion of said band having an elongated slot formed therein extending for a predetermined distance axially of the band and having a width dimension transversely of the band which is substantially equal to the width dimension of said rack teeth whereby said slot receives and cooperates with the protruding portions of the rack teeth on the inner side of said first end portion of the band to guide movement of said first end portion of the band with respect to said second end portion during rotation of said screw; said saddle housing having a pair of mounting lugs bent about the band beneath the inner side of the band adjacent said slot to secure the housing to the band; said second end portion of the band adjacent said slot being bent upwardly away from the remainder of the band to form a projection on the outer side of the second end portion of the band and a recess on the inner side thereof, said recess having a depth substantially equal to the thickness of said housing lugs for receiving the lugs whereby the slot is maintained in close juxtaposition to the protruding portions of the rack to receive and guide the same; said lugs on said housing having free end portions located on the inner side of the band adjacent said slot respectively including a boss received in said slot to resist transverse movement of the lugs with respect to the band.

2. A screw type clamping collar as defined in claim 1 wherein the length of said slot is approximately equal to the length of said saddle housing.

3. A screw type clamping collar as defined in claim 1 wherein said housing has first and second end wall portions spaced from each other in the longitudinal direction of said band, said end walls having aligned openings formed therein rotatably receiving said screw; said openings defining arcuate edges in said housing and walls having a generally circular periphery defining an arc of more than 180° and less than 360°; said edges substantially surrounding and engaging the screw to retain the screw in the housing while allowing rotation thereof.

4. A screw-type clamping collar comprising a flexible band having first and second end portions and inner and outer surfaces; said band having a rack of teeth formed thereon adjacent said first end portion and extending along the band for a predetermined distance, said rack teeth including portions protruding from the inner surface of said band, to be adjacent the part to be clamped; a saddle housing rigidly mounted adjacent the second end portion of said band and having a passage therein for receiving the first end portion of the band above the second end portion thereof; a screw rotatably mounted in said housing and fixed against axial movement thereon, said screw being positioned axially of said band whereby its threads will engage the rack teeth on the first end portion of the band in said housing passage to move said first end portion with respect to said second end portion upon rotation of said screw; said second end portion of said band having an elongated slot formed therein extending for a predetermined distance axially of the band and having a width dimension transversely of the band which is substantially equal to the width dimension of said rack teeth whereby said slot receives and cooperates with the protruding portions of the rack teeth on the inner side of said first end portion of the band to guide movement of said first end portion of the band with respect to said second end portion during rotation of said screw; said saddle housing having a pair of mounting lugs bent about the band beneath the inner side of the band adjacent said slot to secure the housing to the band; said second end portion of the band adjacent said slot being bent upwardly away from the remainder of the band to form a projection on the outer side of the second end portion of the band and a recess on the inner side thereof, said recess having a depth substantially equal to the thickness of said housing lugs for receiving the lugs whereby the slot is maintained in close juxtaposition to the protruding portions of the rack to receive and guide the same; said band having a pair of recesses formed on its inner side on opposite sides of said slot and said lugs on said housing having free end portions located on the inner side of the band adjacent said slot and respectively including a boss received in said recesses to resist transverse movement of the lugs with respect to the band.

5. A screw-type clamping collar, comprising an elongated flexible band having first and second end portions and inner and outer surfaces; a saddle housing secured to said second end portion of the band, and a screw mounted in said housing for free rotation in a fixed axial position in the housing; said housing having a passage formed therein directly above said second end portion of the band for securing the first end portion of the flexible band, when the band is bent, between the housing and said second end portion, said first end portion of the band having a gear-type rack of predetermined length formed therein for engaging and cooperating with the threads of the screw in said housing whereby the first end portion of the band is moved with respect to the second end portion upon rotation of said screw; said rack including protrusions on the inner surface of said flexible band, on the side of the part to be clamped with the collar; and said second end portion of the band at said saddle housing having an elongated opening formed in the axis of the band, said opening having a width substantially corresponding to the width of the rack protruding on the inner surface of the band; whereby said rack protrusions are engaged and maintained transversely in said opening to guide movement of said first end portion of the band with respect to said second end portion; said second end portion of the flexible band adjacent said longitudinal opening being bent to form a projection directed towards the outside of the collar; said housing being secured to said second end portion of the band by integral lugs bent under the inner surface of the band; and the depth of said projection in the second end portion of the band corresponding approximately to the thickness of the lugs of the screw bearing saddle housing, said projection facilitating the maintenance of the rack protrusions in deep engagement in said opening and over a substantial portion of the rack; the lugs of said screw bearing saddle housing each including at least one boss, engaged in said opening in the second end portion of the band to resist transverse movement of the lugs.

6. A screw-type clamping collar as defined in claim 5 wherein said opening has a length which corresponds approximately to the length of the saddle housing and of the screw.

7. A clamping collar as defined in claim 5 wherein said housing has first and second end wall portions spaced from each other in the longitudinal direction of said band, said end walls having aligned openings formed therein rotatably receiving said screw; said openings defining arcuate edges in said housing and walls having a generally circular periphery defining an arc of more than 180° and less than 360°; said edges substantially surrounding and engaging the screw to retain the screw in the housing while allowing rotation thereof.

8. A screw-type clamping collar, comprising an elongated flexible band having first and second end portions and inner and outer surfaces; a saddle housing secured to said second end portion of the band, and a screw mounted in said housing for free rotation in a fixed axial position in the housing; said housing having a passage formed therein directly above said second end portion of the band for securing the first end portion of the flexible band, when the band is bent, between the housing and said second end portion, said first end portion of the band having a gear-type rack of predetermined length formed therein for engaging and cooperating with the threads of the screw in said housing whereby the first end portion of the band is moved with respect to the second end portion upon rotation of said screw; said rack including protrusions on the inner surface of said flexible band, on the side of the part to be clamped with the collar; and said second end portion of the band at said saddle housing having an elongated opening formed in the axis of the band, said opening having a width substantially corresponding to the width of the rack protruding on the inner surface of the band; whereby said rack protrusions are engaged and maintained transversely in said opening to guide movement of said first end portion of the band with respect to said second end portion; said second end portion of the flexible band adjacent said longitudinal opening being bent to form a projection directed towards the outside of the collar; said housing being secured to said second end portion of the band by integral lugs bent under the inner surface of the band; and the depth of said projection in the second end portion of the band corresponding approximately to the thickness of the lugs of the screw bearing saddle housing, said projection facilitating the maintenance of the rack protrusions in deep engagement in said opening and over a substantial portion of the rack; said band having a pair of recesses formed on its inner side on opposite sides of said slot and said lugs each including at least one boss respectively engaged in said recesses to resist transverse movement of the lugs.

* * * * *